(12) United States Patent
Harrington

(10) Patent No.: US 7,394,975 B2
(45) Date of Patent: Jul. 1, 2008

(54) DRIVE CIRCUIT FOR A SENSORED BRUSHLESS DC MOTOR

(75) Inventor: Christopher B. Harrington, Troy, NY (US)

(73) Assignee: Ametek, Inc., Paoli, PA (US)

( * ) Notice: Subject to any disclaimer, the term of this patent is extended or adjusted under 35 U.S.C. 154(b) by 0 days.

(21) Appl. No.: 11/514,060

(22) Filed: Aug. 30, 2006

(65) Prior Publication Data

US 2008/0056688 A1 Mar. 6, 2008

(51) Int. Cl.
*H02P 7/285* (2006.01)
(52) U.S. Cl. ...................................... 388/809; 318/767
(58) Field of Classification Search ................. 318/293, 318/294
See application file for complete search history.

(56) References Cited

U.S. PATENT DOCUMENTS 6,008,602 A * 12/1999 Karwath ................... 318/400.3
6,452,349 B1 * 9/2002 Hahn et al. ............. 318/400.22

* cited by examiner

*Primary Examiner*—Lincoln Donovan
*Assistant Examiner*—Michael Brandt
(74) *Attorney, Agent, or Firm*—Renner Kenner Greive Bobak Taylor & Weber

(57) ABSTRACT

A drive circuit for a sensored brushless DC motor, which has a rotably mounted rotor hub, comprises four legs. Each leg has a MOSFET and a diode configured to form four individual nodes. A first primary stator winding is coupled between the first and second nodes, while a second primary stator winding is coupled between the third and fourth nodes. A Hall sensor and an associated interface circuit which detects positions of magnets associated with the motor. As a result of the detected position, the drive circuit turns the MOSFETs on and off in a specified manner so as to rotate the rotor hub without the need for a snubber circuit.

23 Claims, 6 Drawing Sheets

DRIVE CIRCUIT FOR A SENSORED BRUSHLESS DC MOTOR

TECHNICAL FIELD

The present invention is generally directed to brushless DC motors. Particularly, the present invention is directed to a drive circuit for a brushless DC motor. More particularly, the present invention is related to a drive circuit for a sensored brushless DC motor.

BACKGROUND ART

Sensored brushless DC motors are used to operate any number of devices ranging from consumer devices, such as drive systems for computer hard drives and CD/DVD players to industrial machinery such as drills and conveyer systems. In particular, sensored brushless DC motors may be coupled with a fan assembly in order to provide cooling airflow to sensitive electronic components utilized by computers or other temperature sensitive equipment.

Many applications require that motorized systems perform within certain performance limits or specifications. For example, cooling fans used in military applications must be configured so that its motor provides high reliability, has low electromagnetic interference (EMI) emissions, is able to operate at a high ambient temperature, while being able to withstand contaminated environments. While many sensored brushless DC motors are suitable for such applications, they have stringent performance specifications. Indeed, it is required that the drive circuits used to control, or otherwise operate the motor, utilize costly snubber circuits.

A snubber circuit is designed to prevent a rapid rise in voltage across the stator windings of the brushless DC motor, as current through the windings is being switched during operation of the motor. One example of a snubber circuit is a capacitor that is placed in parallel across the terminals of the switching element used to operate the motor. Due to its nature, the snubber capacitor is required to be periodically discharged of any stored energy it has collected, thus consuming the energy stored in the winding inductance.

Therefore, there is a need for a drive circuit for a sensored brushless DC motor that eliminates the need for a snubber circuit. Furthermore, there is a need for a drive circuit for a sensored brushless DC motor that reduces the voltage stress on each switch of the drive circuit. In addition, there is a need for a drive circuit for a sensored brushless DC motor that provides a path for electrical current to flow and dissipate from the primary windings until the current decays to a nominal value. Furthermore, there is a need for a drive circuit for a sensored brushless DC motor that reduces the voltage stress on each control switch to that of the voltage of the DC power supply used to operate the motor. Additionally, there is a need for a drive circuit for a sensored brushless DC motor that has reduced electromagnetic interference (EMI) emissions.

SUMMARY OF THE INVENTION

In light of the foregoing, it is a first aspect of the present invention to provide a drive circuit for a sensored brushless DC motor.

It is another aspect of the present invention to provide a drive circuit for a sensored brushless DC motor having a rotating rotor hub, the rotor hub carrying a rotor magnet having magnetic north and south poles, the drive circuit comprising a first leg comprising a first p-type MOSFET having a gate, a source and a drain, a first diode, coupled to the first p-type MOSFET, such that a cathode of the first diode is coupled to the drain of the first p-type MOSFET to create a first node, a second leg comprising a first n-type MOSFET having a gate, a source and a drain, a second diode, coupled to the first n-type MOSFET, such that an anode of the second diode is coupled to the drain of the first n-type MOSFET to create a second node, a first primary winding coupled between the first and second nodes, a third leg comprising a second p-type MOSFET having a gate, a source and a drain, a third diode, coupled to the second p-type MOSFET, such that a cathode of the third diode is coupled to the drain of the MOSFET to create a third node, a fourth leg comprising a second n-type MOSFET having a gate, a source and a drain, a forth diode, coupled to the second n-type MOSFET, such that an anode of the fourth diode is coupled to the drain of the second n-type MOSFET to create a fourth node, a second primary winding coupled between the third and fourth nodes, wherein the source of the first p-type MOSFET and the second p-type MOSFET are coupled to the cathode of the second and fourth diodes at a fifth node, and wherein the anode of the first and third diodes are coupled to the source of the first n-type MOSFET and the second n-type MOSFET at a sixth node.

Yet another aspect of the present invention is a drive circuit for a sensored brushless DC motor having a rotating rotor hub, the rotor hub carrying a rotor magnet having magnetic north and south poles, the drive circuit comprising a first leg comprising a first switch having first and second terminals, a first diode, oriented such that a cathode of the first diode is coupled to the first terminal of the first switch to create a first node, a second leg comprising a second switch having first and second terminals, a second diode, oriented such that an anode of the second diode is coupled to the first terrminal of the second switch to create a second node, a first primary winding coupled between the first and second nodes, a third leg comprising a third switch having first and second terminals, a third diode, oriented such that a cathode of the third diode is coupled to the first terminal of the third switch to create a third node, a fourth leg comprising a fourth switch having first and second terminals, a fourth diode, oriented such that an anode of the fourth diode is coupled to the first terminal of the fourth switch to create a fourth node, a second primary winding coupled between the third and fourth nodes, wherein the second terminals source of the first and third switches are coupled to a cathode of the second diode and an anode of the fourth diode at a fifth node, and wherein an anode of the first diode and an anode of the third diode are coupled to the second terminal of said second and fourth switches at a sixth node.

Still another aspect of the present invention is a motor drive circuit comprising a stator having at least two stator windings, a rotor having at least two magnets movable about said at least two windings, a first phase circuit associated with a first stator winding, a second phase circuit associated with a second stator winding, a power supply connected to the first and second phase circuits to supply power to the respective stator windings, the first and second phase circuits turning off and on in a reciprocating manner depending upon a position of the at least two magnets with respect to the at least two stator windings, wherein each phase circuit provides a return path, when in an off condition, for current developed in the corresponding stator winding when in an on condition.

BRIEF DESCRIPTION OF THE DRAWINGS

For a complete understanding of the objects, techniques and structure of the invention, reference should be made to the following detailed description and accompanying drawings, wherein:

FIG. 5 is a schematic diagram of the drive circuit for use with the sensored brushless DC motor, showing a current path Ia when a first phase circuit is turned on;

FIG. 6 is a schematic diagram showing the relative position of the hub magnets carried by the rotor hub, with respect to the primary windings of the stator when the first phase circuit is turned on;

FIG. 9 is a schematic diagram of the drive circuit for use with the sensored brushless DC motor, showing a current path Ib when a second phase circuit is turned on;

FIG. 10 is a schematic diagram showing the relative position of the hub magnets, carried by the rotor hub, with respect to the primary windings of the stator when the second phase circuit is turned on;

BEST MODE FOR CARRYING OUT THE INVENTION

Figure 1:
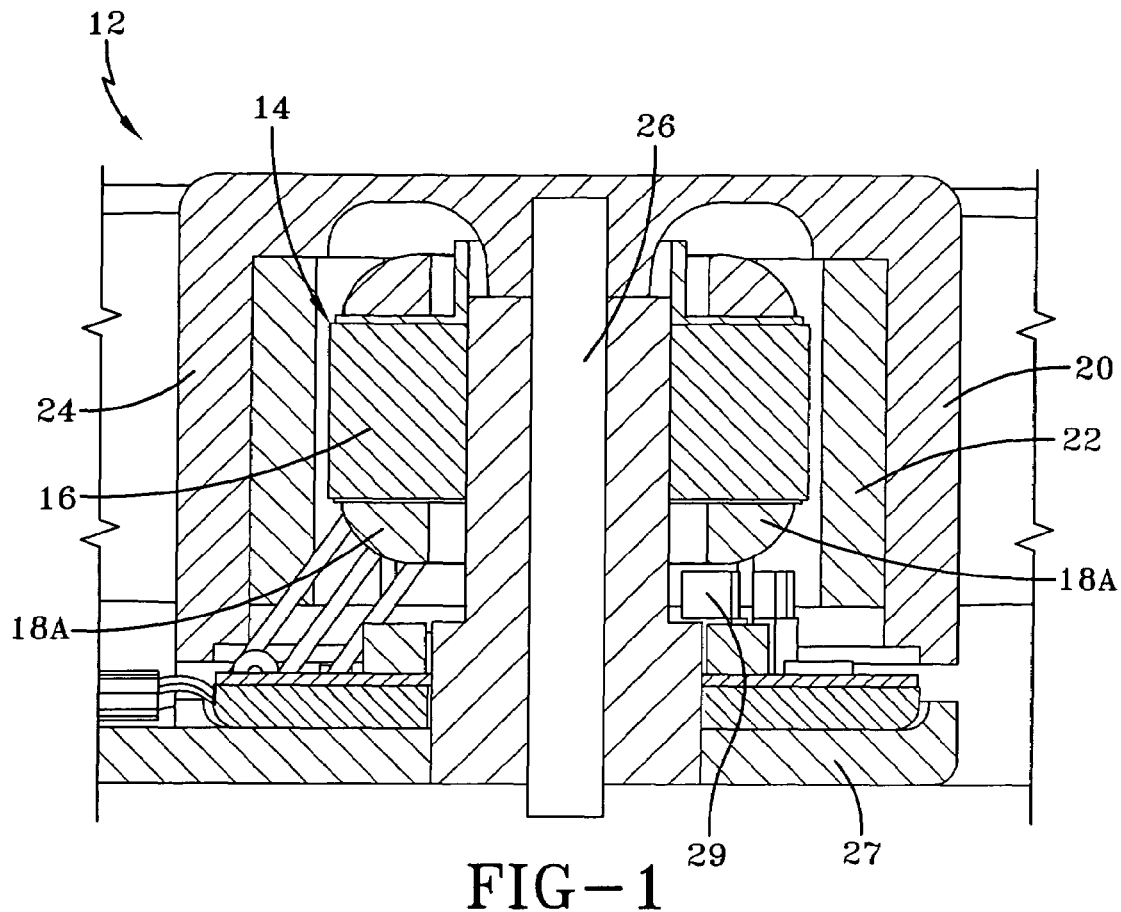
FIG. 1 is a cross-sectional view of a sensored brushless DC motor according to the present invention, showing a fixed stator and a rotating rotor hub.
Figure 2:
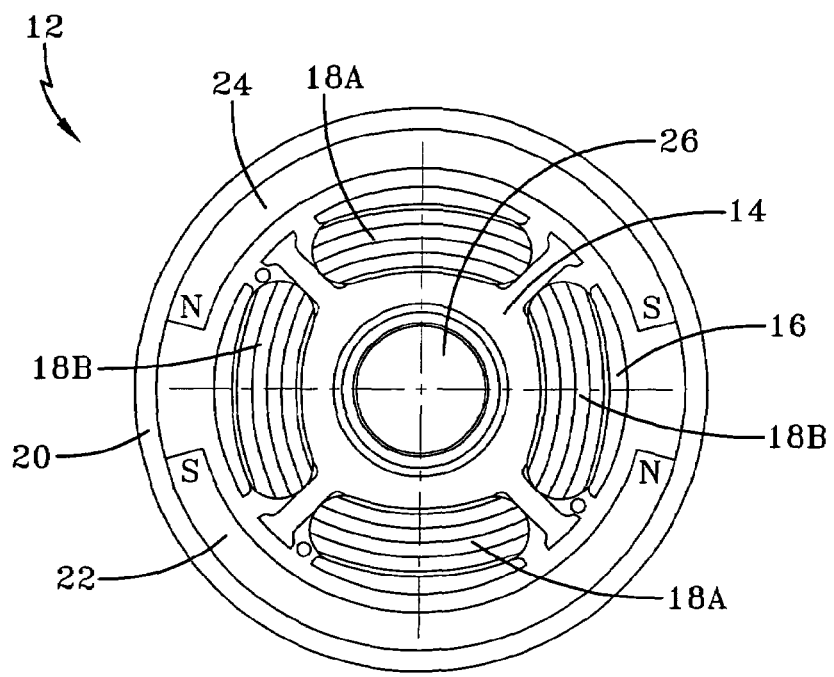
FIG. 2 is a top plan view of the sensored brushless DC motor, showing the fixed stator and rotating rotor hub.
Figure 3:
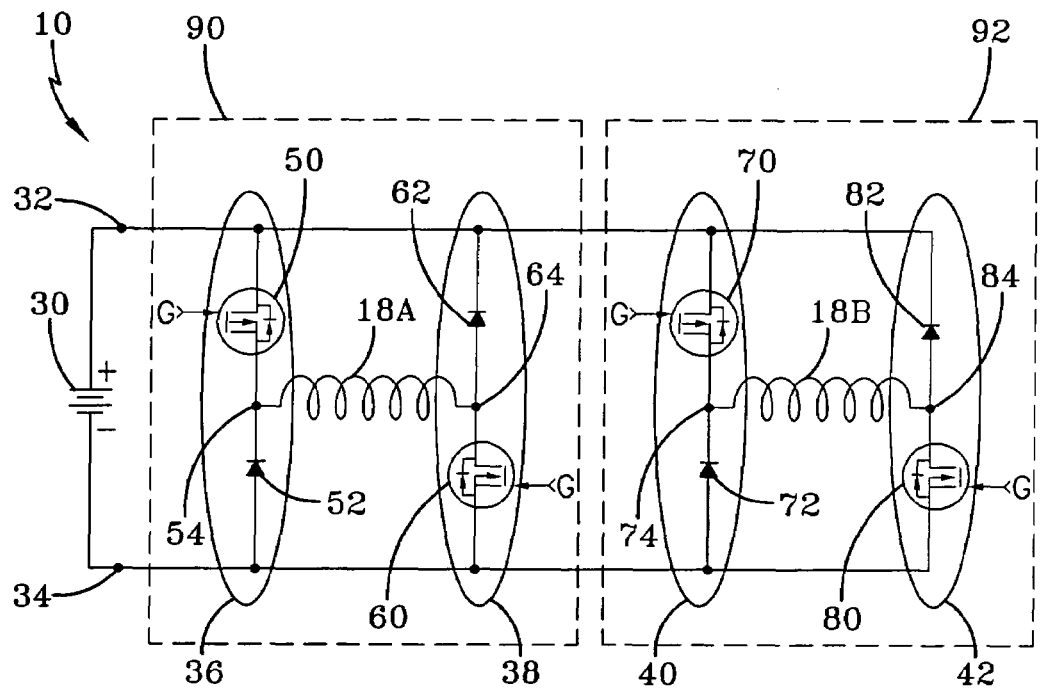
FIG. 3 is a schematic diagram of a drive circuit according to the present invention, for use with the sensored brushless DC motor.

Prior to discussing the particular aspects of a drive circuit 10, made in accordance with the present invention, a general overview of the components that comprise a sensored brushless DC motor 12, as shown in FIGS. 1 and 2 will be initially presented. Specifically, the brushless DC motor 12 comprises a fixed stator 14 that includes stator laminations 16 that carry primary stator windings 18A and 18B. The primary stator windings 18 are denoted by the letters A and B and are arranged in substantially perpendicular orientation with respect to each other as shown more clearly in FIG. 2. The stator 14 is substantially surrounded by a rotor hub 20 carrying rotor magnets 22 and 24 on its inner surface. The rotor hub 20 is carried by a shaft 26. A mounting substrate 27, which may be attached to a piece of equipment that utilizes the structural benefits of the motor 12, carries a bearing (not shown) that receives the shaft 26. Accordingly, the shaft 26 and the hub 20 are allowed to freely rotate with respect to substrate 27. Alternatively, it should also be appreciated that the brushless DC motor 12 may be configured in an inverse orientation, whereby the fixed stator 14 and the rotor hub 20 exchange positions, such that the fixed stator 14 surrounds the outer surface of the rotor hub 20 that rotates therewithin. Continuing, a Hall-effect, or Hall sensor 29, best seen in FIG. 1, is used to monitor the location of the rotor hub 20 and specifically the magnets 22 and 24 as the hub rotates during the operation of the motor 12. As will be described in detail, the Hall sensor 29 provides positional and/or rotational input to the drive circuit 10 which controls the movement of the rotor hub 20. In order to rotate the rotor hub 20, the drive circuit 10 supplies electrical current to the primary stator windings 18A and 18B in an alternating and synchronized manner to be set forth below. As such, the discussion that follows is directed to a circuit topology and operation methodology that is used to achieve the operation of the sensored brushless DC motor 12. It will be appreciated that the substrate 27 carries a printed circuit board upon which the drive circuit 10, which includes the Hall sensor 29, is maintained.

The drive circuit 10 for use with the brushless DC motor 12 and corresponding schematic representations of the magnets and the windings are shown in FIGS. 3-12. It will be appreciated that FIGS. 3, 5, 7, 9 and 11 show the drive circuit 10 during various phases of operation and that FIGS. 4, 6, 8, 10 and 12 are schematic representations of the magnets 22 and 24 position with respect to the windings 18A and 18B and which correspond to the respective preceding FIGS. For example, FIG. 4 corresponds with FIG. 3, FIG. 6 corresponds with FIG. 5, and so on. Specifically, the drive circuit 10 comprises a DC power supply 30, which has a positive terminal at a node 32, and a negative, or ground, terminal at a node 34. Coupled or otherwise electrically connected across nodes 32 and 34 are legs 36, 38, 40, and 42. Each leg includes a MOSFET and a diode. As is commonly understood, each MOSFET includes a gate (G), a source (S), and a drain (D); and each diode includes an anode and a cathode.

The leg 36 comprises a p-type metal oxide semiconductor field effect transistor or MOSFET 50, and a diode 52 coupled such that the drain, denoted "D," of the p-type MOSFET 50 is coupled to the cathode of the diode 52 at a node 54. The source of the MOSFET 50 is coupled to node 32, and the anode of the diode 52 is coupled to node 34. Leg 38 comprises an n-type MOSFET 60 and a diode 62, coupled such that the drain D of the MOSFET 60 is coupled to the anode of the diode 62 at a node 64. In addition, the source S of the MOSFET 60 is coupled to node 34, and the cathode of the diode 62 is coupled to node 32. Connected between node 54 and node 64 are respective ends of the primary winding 18A.

Leg 40 comprises a p-channel MOSFET 70 and a diode 72 coupled such that the drain D of the MOSFET 70 is coupled to the cathode of the diode 72 at a node 74. Additionally, the source S of the MOSFET 70 is coupled to node 32, while the anode of the diode 72 is coupled to node 34 of the drive circuit 10. Leg 42 comprises an n-type MOSFET 80 and a diode 82 coupled such that the drain D of the MOSFET 80 is coupled to the anode of the diode 82 at a node 84. Additionally, the source S of the MOSFET 80 is coupled to node 34, while the cathode of the diode 82 is coupled to node 32. Finally, connected between node 74 and 84 are the respective ends of the primary stator winding 18B. It is also contemplated that the n-type MOSFET 60 and 80 may comprise p-type MOSFETS, and p-type MOSFETS 50 and 70 may comprise n-type MOSFETS, while still providing equivalent operation of the motor 12.

Figure 4:
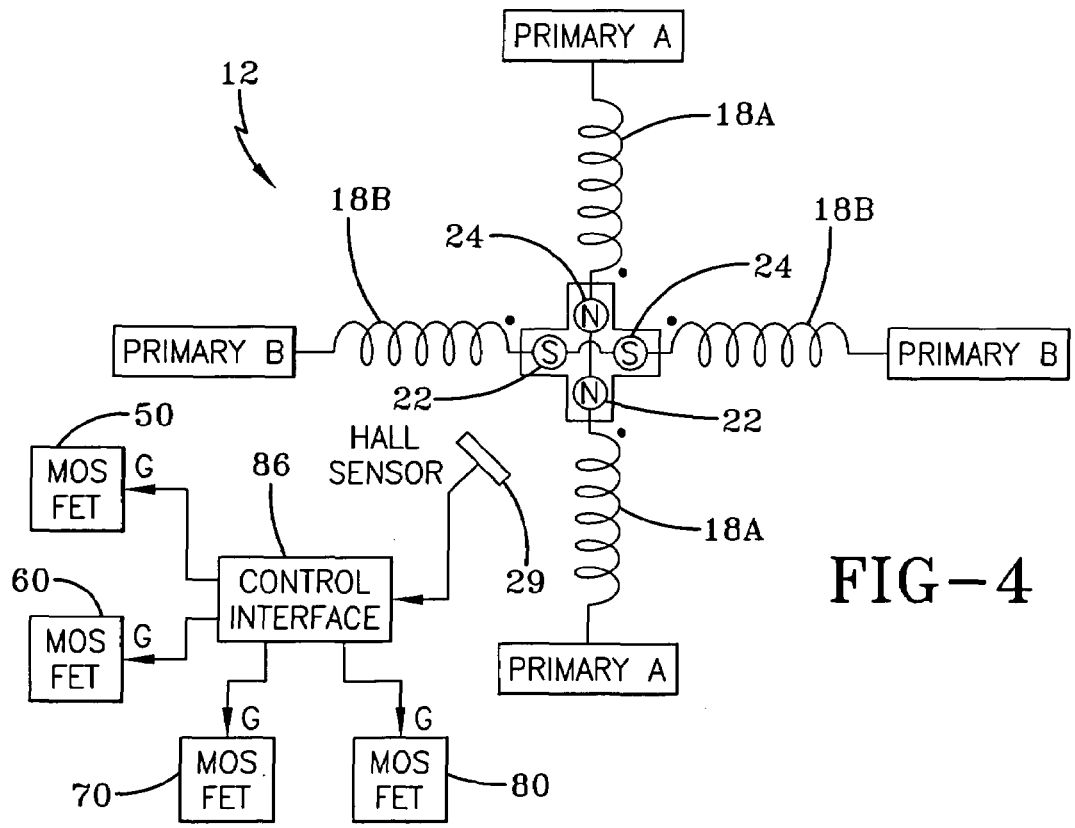
FIG. 4 is a schematic diagram showing an initial relative position of hub magnets carried by the rotor hub with respect to primary windings of the stator prior to the operation of the motor.

The operation of the drive circuit 10 with the sensored brushless DC motor 12 is enabled by a control interface 86, shown in FIG. 4, that is coupled to the Hall sensor 29, and which supplies suitable control signals to the gate terminals G of each of the MOSFETS 50, 60, 70, and 80. Additionally, the communication of the control signals from the control interface 86 to the gate terminals G of the MOSFETS 50, 60, 70, and 80 are depicted in FIGS. 3-12 by arrow symbols. These control signals are generated in a coordinated manner that generally coincides with the detection of the north and south poles of the rotor magnets 22, 24 by the Hall sensor 29. This coordinated action allows the MOSFETS 50, 60, 70, and 80 to be turned on and off in a manner to be discussed. It should be appreciated that the control interface 86 comprises the necessary suitable hardware, software, and/or memory to generate suitable control signals so as to turn the MOSFETS on and off.

The process by which the motor 12 rotates the rotor hub 20 in a complete revolution is comprised generally of four steps. Initially, as shown in FIG. 4, the motor 12 is deactivated, in so far as the rotor hub 20 is not rotating, thus leaving the magnetic poles of the rotor magnets 22 and 24 in a random orientation with respect to the primary windings 18A and 18B of the stator 14. For example, the north poles of the rotor magnets 22 and 24, denoted by "N," may be aligned with the primary stator winding 18A, while the south poles of the rotor magnets 22 and 24, denoted by "S," may be aligned with the primary stator winding 18B.

Figure 5:
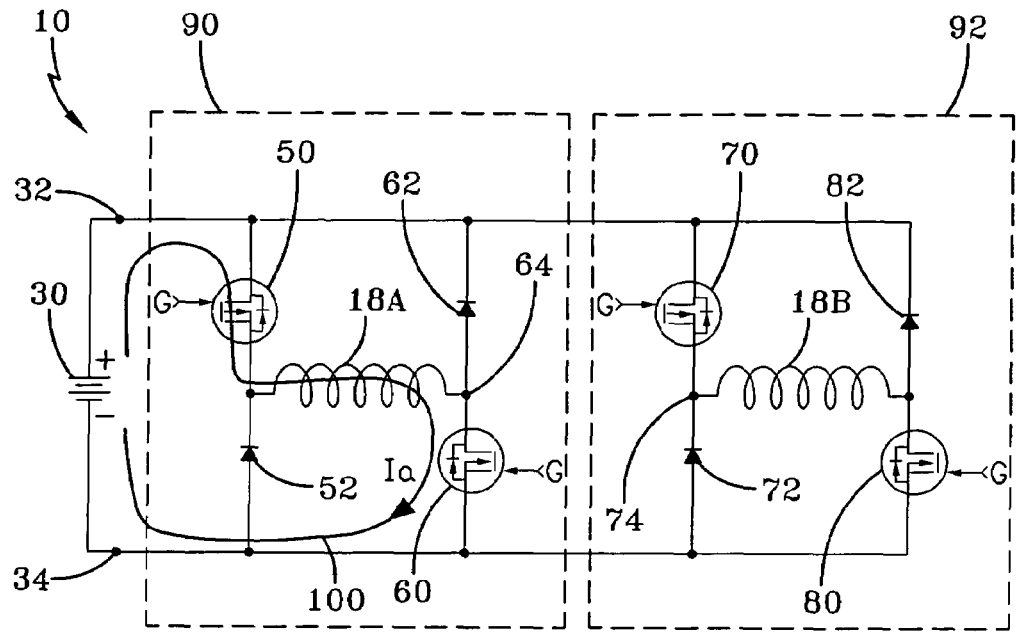
Figure 6:
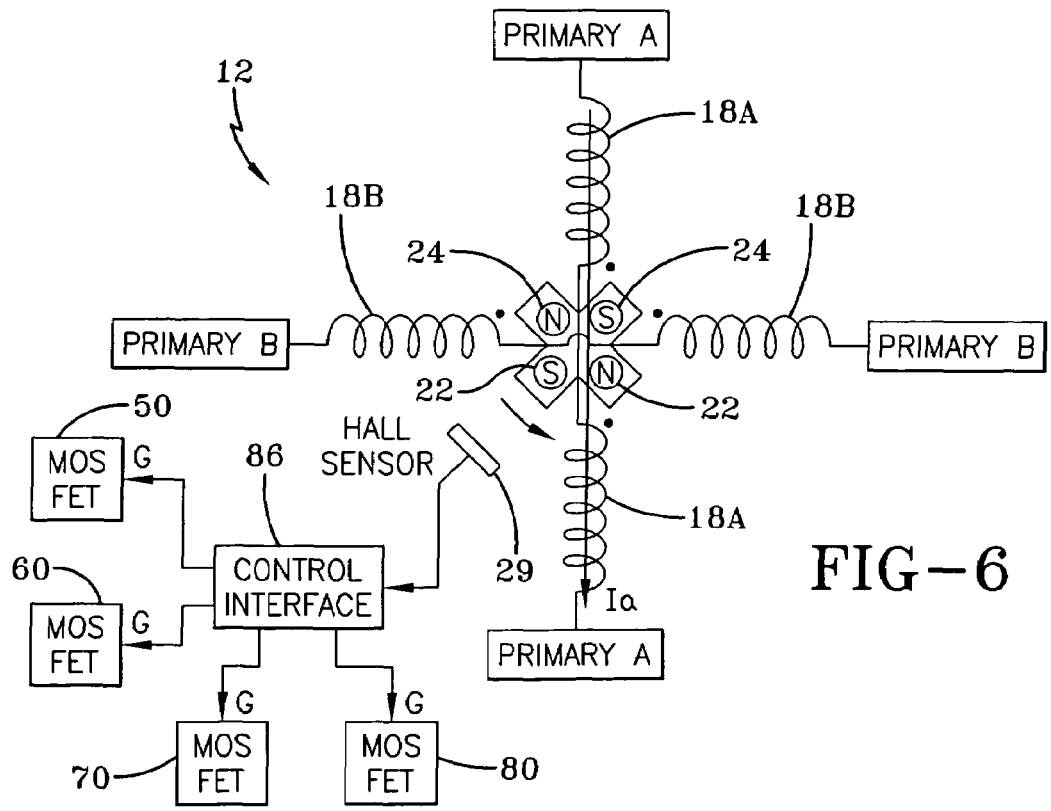
Figure 7:
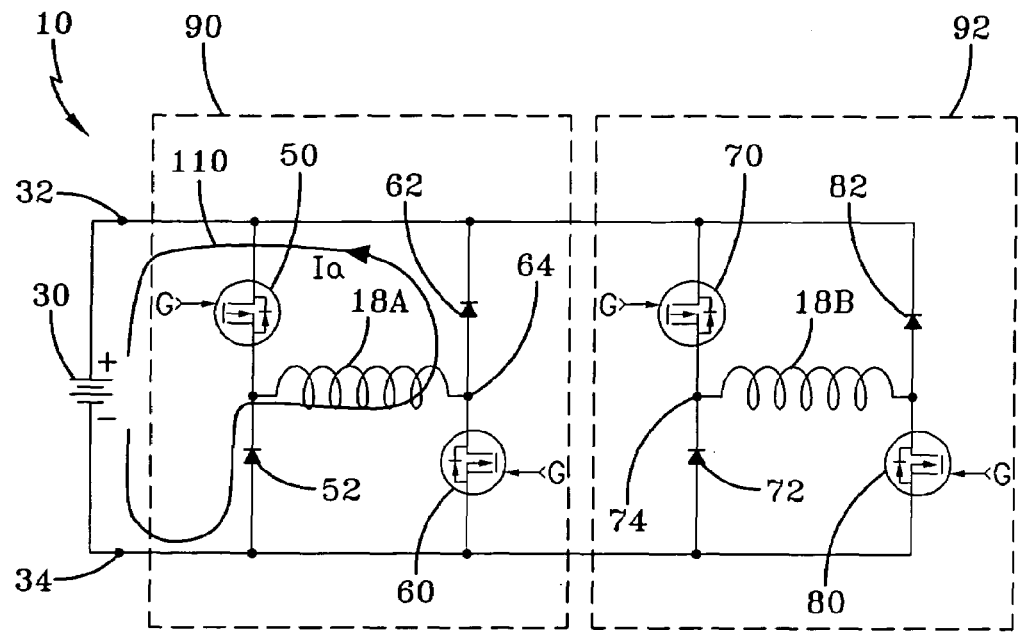
FIG. 7 is a schematic diagram of the drive circuit for use with the sensored brushless DC motor, showing the current path Ia when the first phase circuit is turned off.
Figure 8:
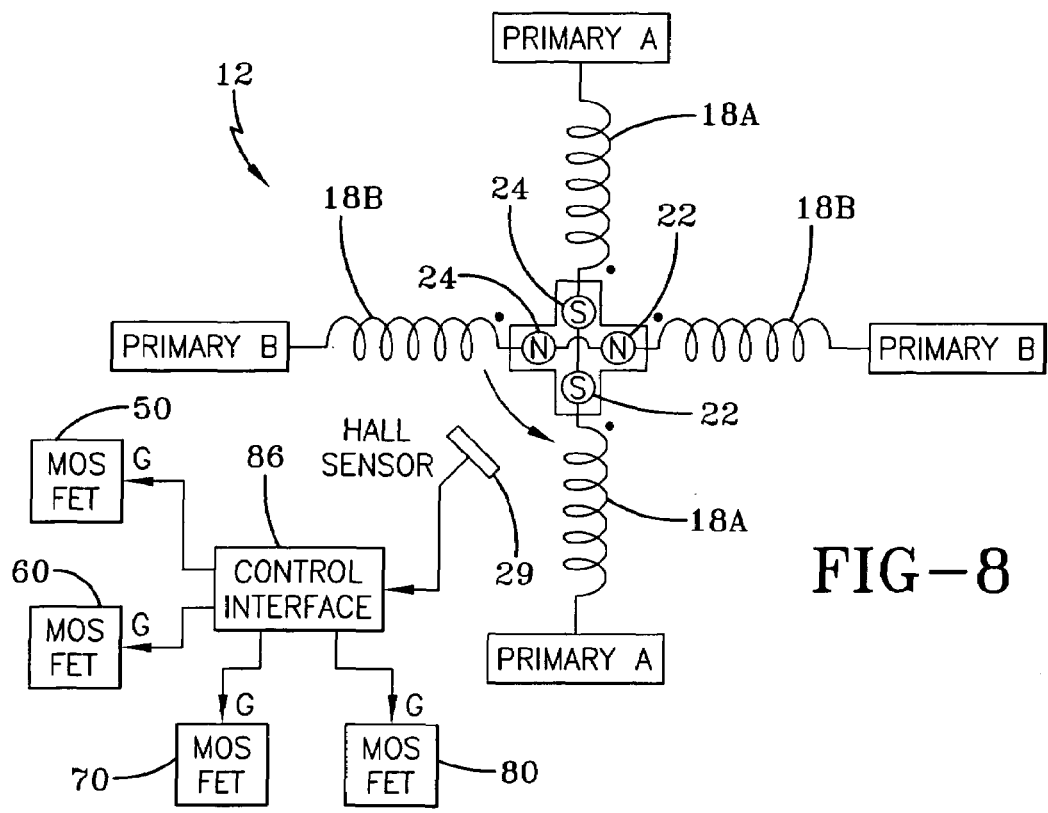
FIG. 8 is a schematic diagram showing the relative position of the hub magnets, carried by the rotor hub, with respect to the primary windings of the stator when the first phase circuit is turned off.

Next, when the DC motor 12 is energized, the MOSFETS 50 and 60 are turned "on," while MOSFETS 70 and 80 are turned "off" by providing a suitable voltage to their respective gate terminals G via the control interface 86. When the MOSFETS 50 and 60 are turned "on," the voltage from the DC power supply 30 is applied across the primary windings 18A, thus causing a current Ia to flow in the direction of a path 100, as shown in FIG. 5. That is, the current Ia flows through the MOSFET 50, the primary winding 18A, and the MOSFET 60, where it returns back to the negative terminal of the power supply 30. The current Ia causes the rotor hub 20 to rotate in a counterclockwise manner into the position shown in FIG. 6. As the south pole S of the rotor magnet 22 passes the Hall sensor 29, MOSFETS 50 and 60 are turned off by the control interface 86, which provides a suitable voltage at each of their gate terminals G as previously discussed. Because the current Ia developed in the inductance of the primary winding 18A is unable to instantaneously decay toward zero or other nominal value instantaneously, the current Ia continues to flow in the same direction through the primary winding 18A, while taking a new path 110 passing through the diodes 52 and 62 and returning to the positive terminal of the power supply 30 at node 32, as shown in FIG. 7. Since the voltage of power supply 30 opposes the current in primary winding 18A, the current Ia subsequently is diminished to zero. As such, the presence of diodes 52 and 62 prevent the current Ia stored in the inductance of the primary stator winding 18A from going negative. Furthermore, the inertia generated from the initial rotation of the rotor hub 20, as discussed with respect to FIG. 6, allows the rotor hub 20 to continue rotating until the rotor hub 20 is positioned such that the south poles S of the rotor magnets 22 and 24 are aligned with the primary winding 18A, while the north poles N of the rotor magnets 22 and 24 are aligned with the primary winding 18B of the stator 14, as shown in FIG. 8.

Figure 9:
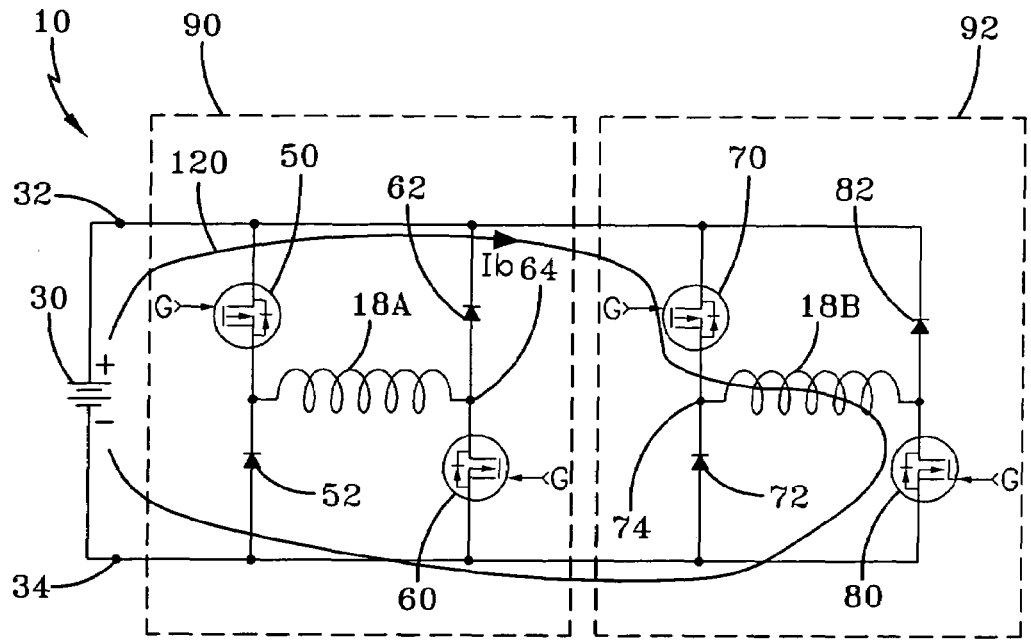
Figure 10:
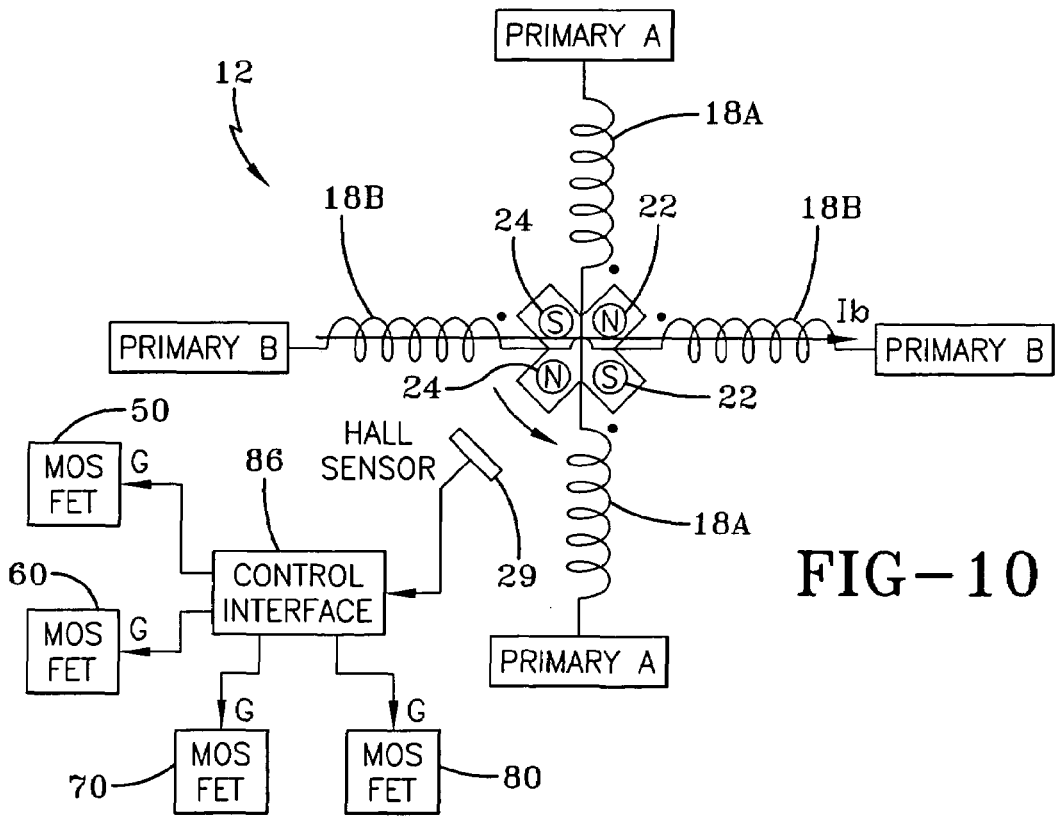
Figure 11:
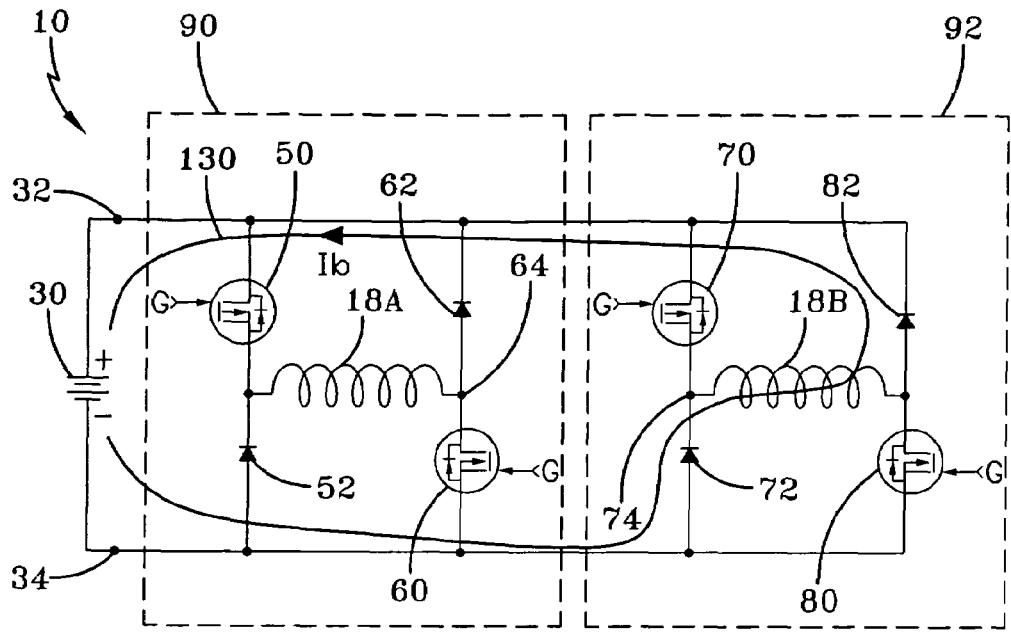
FIG. 11 is a schematic diagram of the drive circuit for use with a sensored brushless DC motor, showing the current path Ib when the second phase circuit is turned off.
Figure 12:
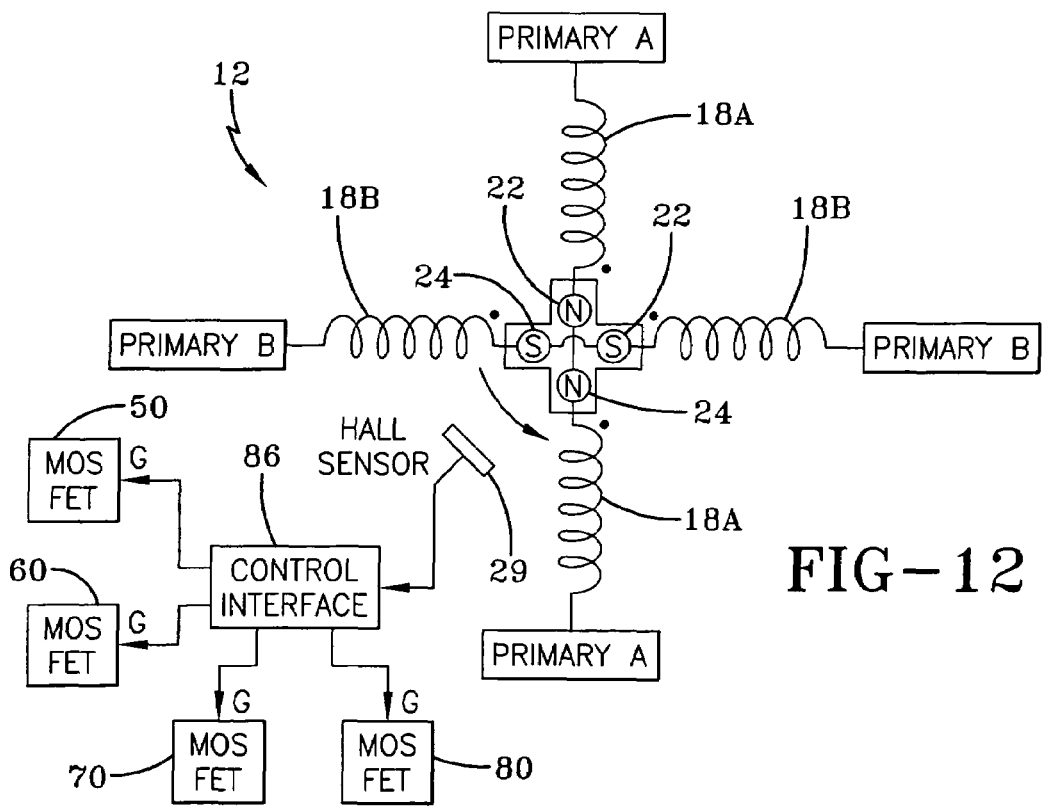
FIG. 12 is a schematic diagram showing the relative position of the hub magnets, carried by the rotor hub, with respect to the primary windings of the stator when the second phase circuit is turned off.

When MOSFETS 50 and 60 are turned off by the control interface 86 due to the detection of the south pole S of the rotor magnet 22 at the Hall sensor 29, MOSFETS 70 and 80 are somewhat simultaneously turned on by the control interface 86. Accordingly, the voltage of the DC power supply 30 is applied across the primary winding 18B, as shown in FIGS. 9 and 10. It should be appreciated that while the transition between the turning on and off the MOSFETS 50,60 and 70,80 is generally controlled by the detection of the arrival of the various poles of the rotor magnets 22,24, the control interface 86 may be configured to provide an additional delay or advance in the switching time period between the switching of the MOSFETS 50,60 and 70,80 on and off. As such, the degree to which the current Ia returns back to the power supply 30 via path 110 may vary. For example, if there is a larger time period between the switching of MOSFETS 50,60 off and MOSFETS 70,80 on, then, substantially more current Ib will return to the power supply 30. However, if there is a smaller time period between the switching of MOSFETS 50,60 off, and MOSFETS 70,80 on, then less current will return to the power supply 30, while the remaining current is subsumed by the current Ib that flows through the legs 40 and 42 via path 120, as MOSFETS 70 and 80 are turned on. Continuing, when MOSFETS 50 and 60 are turned off and MOSFETS 70 and 80 are tuned on, voltage from the power supply 30 causes a current Ib to flow in the direction of the path 120. That is, the current Ib flows through the MOSFET 70, the primary stator winding 18B, the MOSFET 80, while returning back to the negative terminal of the DC power supply 30 at node 34. The current Ib causes the rotor hub 20 to continue its rotation in a counterclockwise manner into the position shown in FIG. 10. As the north pole N of the rotor magnet 24 passes the Hall sensor 29, the MOSFETS 70 and 80 are turned off by the control interface 86, by applying a suitable voltage to their gate terminals G. Again, because the current Ib developed in the inductance of the primary winding 18B is unable to instantaneously decay toward a nominal value such as zero, the current Ib continues to flow in the same direction through the primary stator winding 18B while taking a new path 130, as shown in FIG. 11. That is, the current Ib flows through the diode 72, the primary winding 18B, the diode 82, returning to the positive terminal of the DC power supply 30 at node 32. As the current Ib follows path 130, the current Ib returns to the DC power supply 30 until the current Ib falls to zero or other nominal value. And as before, since the voltage of power supply 30 opposed the current in the primary winding 18B, the current Ib is subsequently diminished to zero. Furthermore, the rotational inertia generated from the rotation of the rotor hub 20, as discussed with regard to FIG. 10 causes the rotor hub 20 to continue rotating in a counterclockwise manner until the rotor hub 20 is positioned such that the north poles N of the rotor magnets 22 and 24 are aligned with the primary winding 18A, and the south poles S of the rotor magnets 22 and 24 are aligned with the primary winding 18B of the stator 14, as shown in FIG. 12. While the prior discussion relates to a single revolution of the rotor hub 20, it is readily apparent that by repeating the process discussed that the motor 12 may be continually operated.

Furthermore, in an aspect of the present invention 10, legs 36, 38 and the primary winding 18A of the drive circuit 10 may comprise a first phase circuit 90. In a similar manner, legs 40 and 42 and primary winding 18B may comprise a second phase circuit 92. It is also contemplated that each of the MOSFETS 50, 60, 70, 80 may be in the form of any suitable switch, such as a bipolar transistor, for example. The power supply 30 of the drive circuit 10 is connected to the first and second phase circuits 90, 92, such that the first and second phase circuits turn off and on in a reciprocating manner depending upon the position of the rotor magnets 22, 24 with respect to the stator windings 18A, 18B. Moreover, both the first and the second phase circuits 90, 92 provide a return path, when in an off condition, for electrical current developed in the stator winding 18 that is associated with an on condition. The Hall sensor is also positioned to detect the poles of the rotor magnets 22, 24, and as such, the control interface controls the on and off conditions of the first and second phase circuits 90, 92. More specifically, each phase circuit (90 or 92) comprises a first switch (50 or 70) having one end connected to the power supply 30, and a first diode (52 or 72) having its anode connected to the power supply 30. Moreover, each phase circuit comprises a second switch (60 or 80) having one end connected to the power supply 30, while the second diode (62 or 82) is connected to the power supply 30 via its cathode. In addition, the stator winding 18 has a first and a second winding end, such that the first winding end is connected to the opposite end of the first switch (50 or 70) and is connected to a cathode of the first diode (52 or 72). And the corresponding stator winding has its second winding end connected to an opposite end of the second switch (60 or 80), and connected to an anode of the second diode (62 or 82).

In another aspect of the present invention 10, the first and second switches are turned on and off in each respective phase circuit substantially simultaneously. As a result, electrical current flows through the first and second switches of a phase circuit, and the stator winding 18 when the first and second switches of a phase circuit are on, and the current flows and dissipates through the respective first and second diodes and the stator winding 18 of the phase circuit, when the first and second switches are off.

Based on the foregoing, it will be appreciated that numerous advantages are realized by use of the drive circuit 10 and the associated components. One advantage of a drive circuit according to the concepts of the present invention is that a costly snubber circuit or snubber capacitor is not needed to store the energy generated within the inductance of the primary stator windings. Another advantage of the drive circuit according to the concepts of the present invention is that the energy stored within the inductance of the primary stator windings is returned to the DC power supply, thus reducing the stress on the MOSFETS of the drive circuit, while utilizing the stored energy instead of dissipating it. Still another advantage of a drive circuit according to the concepts of the present invention is that voltage stress of each switch is limited to only that generated by the DC power supply. Furthermore, another advantage of the drive circuit according to the concepts of the present invention is that the electromagnetic interference (EMI) emissions are reduced.

Thus, it can be seen that the objects of the invention have been satisfied by the structure and presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A drive circuit for a sensored brushless DC motor having a rotating rotor hub, the rotor hub carrying a rotor magnet having magnetic north and south poles, said drive circuit comprising:
   a first leg comprising:
      a first p-type MOSFET having a gate, a source and a drain;
      a first diode, coupled to said first p-type MOSFET, such that a cathode of said first diode is coupled to the drain of said first p-type MOSFET to create a first node;
   a second leg comprising:
      a first n-type MOSFET having a gate, a source and a drain;
      a second diode, coupled to said first n-type MOSFET, such that an anode of said second diode is coupled to the drain of said first n-type MOSFET to create a second node;
      a first primary winding coupled between said first and second nodes;
   a third leg comprising:
      a second p-type MOSFET having a gate, a source and a drain;
      a third diode, coupled to said second p-type MOSFET, such that a cathode of said third diode is coupled to the drain of said MOSFET to create a third node;
   a fourth leg comprising:
      a second n-type MOSFET having a gate, a source and a drain;
      a forth diode, coupled to said second n-type MOSFET, such that an anode of said fourth diode is coupled to the drain of said second n-type MOSFET to create a fourth node;
      a second primary winding coupled between said third and fourth nodes, wherein said first MOSFETS provide control over said first primary winding and said second MOSFETS provide control over said second primary winding, so as to provide two-phase control thereof;
   herein the source of said first p-type MOSFET and said second p-type MOSFET are coupled to the cathode of said second and fourth diodes at a fifth node; and wherein the anode of said first and third diodes are coupled to the source of said first n-type MOSFET and said second n-type MOSFET at a sixth node, and wherein during operation of the drive circuit, said first MOSFETS are substantially simultaneously turned off before said second MOSFETS are turned on, and said second MOSFETS are substantially simultaneously turned off before said first MOSFETS are turned on.

2. The drive circuit of claim 1, further comprising:
   a Hall sensor to detect the presence of the poles of the rotor magnet.

3. The drive circuit of claim 2, further comprising:
   a control interface coupled to said gate of each said MOSFET and to said Hall sensor, wherein said control interface turns said MOSFETS on and off in a reciprocating manner as the poles of the rotor magnet are detected by said Hall sensor.

4. The drive circuit of claim 2, wherein said first p and n-type MOSFETS are turned on, and said second p and n-type MOSFETS are turned off, after said Hall sensor detects one of the poles of the rotor magnet, and wherein said first p and n-type MOSFETS are turned off, and said second p and n-type MOSFETS are turned on after said Hall sensor detects another one of the poles of the rotor magnet.

5. A drive circuit for a sensored brushless DC motor having a rotating rotor hub, the rotor hub carrying a rotor magnet having magnetic north and south poles, said drive circuit comprising:
   a first leg comprising:
      a first switch having first and second terminals;
      a first diode, oriented such that a cathode of said first diode is coupled to the first terminal of said first switch to create a first node;
   a second leg comprising:
      a second switch having first and second terminals;
      a second diode, oriented such that an anode of said second diode is coupled to the first terminal of said second switch to create a second node;
      a first primary winding coupled between said first and second nodes;
   a third leg comprising:
      a third switch having first and second terminals;
      a third diode, oriented such that a cathode of said third diode is coupled to the first terminal of said third switch to create a third node;

a fourth leg comprising:
a fourth switch having first and second terminals;
a fourth diode, oriented such that an anode of said fourth diode is coupled to the first terminal of said fourth switch to create a fourth node;
a second primary winding coupled between said third and fourth
nodes, wherein said first and second switches provide control over said first primary winding and said third and fourth switches provide control over said second primary winding, so as to provide two-phase control thereof;
wherein the second terminals source of said first and third switches are coupled to a cathode of said second diode and an anode of said fourth diode at a fifth node; and wherein an anode of said first diode and an anode of said third diode are coupled to the second terminal of said second and fourth switches at a sixth node, and wherein said first and second switches are substantially simultaneously turned off before said third and fourth switches are turned on, and said third and fourth switches are substantially simultaneously turned off before said first and second switches are turned on.

6. The drive circuit of claim 5, wherein at least one of said switches comprises a MOSFET.

7. The drive circuit of claim 6, wherein said first and third switches are p-type MOSFETS.

8. The drive circuit of claim 7, wherein said second and fourth switches are n-type MOSFETS.

9. The drive circuit of claim 6, wherein said fist and third switches are n-type MOSFETS.

10. The drive circuit of claim 9, wherein said second and fourth switches are p-type MOSFETS.

11. The drive circuit of claim 5, further comprising:
a Hall sensor to detect the presence of at least one of the poles of the rotor magnet.

12. The drive circuit of claim 11, further comprising:
a control interface coupled to each said switch and to said hall sensor, wherein said control interface turns said switches on and off in a reciprocating manner as the poles of the rotor magnet are detected by said Hall sensor.

13. The drive circuit of claim 11, wherein said first and second switches are turned on, and said third and fourth switches are turned off, after said Hall sensor detects one of the poles of the rotor magnet, and wherein said first and second switches are turned off, and said third and fourth switches are turned on, after said Hall sensor detects another pole of the rotor magnet.

14. A motor drive circuit comprising:
a stator having at least two stator windings;
a rotor having at least two magnets movable about said at least two windings;
a first phase circuit having a first set of switches associated with a first stator winding;
a second phase circuit having a second set of switches associated with a second stator winding;
a power supply connected to said first and second phase circuits to supply power to said respective stator windings, said first set of switches turning off substantially simultaneously before said second set of switches turns on, said switching of said first and second sets of switches occuring in a reciprocating manner depending upon a position of said at least two magnets with respect to said at least two stator windings;
wherein each said phase circuit provides a return path, when in an off condition, for current developed in said corresponding stator winding when in an on condition, so as to provide two-phase control over said first and second stator windmnns.

15. The drive circuit according to claim 14, further comprising:
a Hall sensor positioned to detect poles of said magnets and controlling the on and off conditions of said phase circuits.

16. The drive circuit according to claim 15, wherein each said phase circuit comprises:
a first switch having one end connected to said power supply;
a first diode having an anode connected to said power supply;
a second switch having one end connected to said power supply;
a second diode having a cathode connected to said power supply;
said corresponding stator winding having a first winding end connected to an opposite end of said first switch and a cathode of said first diode, and said corresponding stator winding having a second winding end connected to an opposite end of said second switch and an anode of said second diode.

17. The drive circuit according to claim 16, wherein said first and second switches of said first phase circuit are turned on such that current flows through said first and second switches and said stator winding of said first phase circuit, said first and second switches turning on after said first and second switches of said second phase circuit are substantially simultaneously turned off, wherein said current stored in said second stator winding flows and dissipates through said first and second diodes of said second phase circuit.

18. The drive circuit according to claim 17, wherein said first and second switches are MOSFETS.

19. The drive circuit according to claim 18, wherein one of said MOSFETs is a p-type and the other of said MOSFETs is an n-type.

20. The drive circuit according to claim 18, wherein each said MOSFET is turned on and off based upon signals generated by said Hall sensor.

21. The drive circuit according to claim 18, wherein said Hall sensor controls operation of said first and second switches.

22. The drive circuit according to claim 15, further comprising:
a control interface receiving magnet position information from said Hall sensor, said control interface programmed to turn said first and second phase circuits on and off depending upon said magnet position information.

23. The drive circuit according to claim 16, wherein said first and second switch of said second phase circuit are turned on such that current flows through said first and second switches and said stator winding of said second phase circuit, said first and second switches of said second phase circuit turning on after said first and second switches of said first phase circuit are substantially simultaneously turned off, wherein said current stored in said first stator winding flows and dissipates through said first and second diodes of said first phase circuit.

* * * * *

UNITED STATES PATENT AND TRADEMARK OFFICE
CERTIFICATE OF CORRECTION

PATENT NO. : 7,394,975 B2 Page 1 of 1
APPLICATION NO. : 11/514060
DATED : July 1, 2008
INVENTOR(S) : Christopher B. Harrington It is certified that error appears in the above-identified patent and that said Letters Patent is hereby corrected as shown below:

In Column 9, line 31 (Claim 9, line 1) the word "fist" should read --first--;
In Column 9, line 40 (Claim 12, line 3) the word "hall" should read --Hall--;
In Column 10, line 5 (Claim 14, line 5) the word "windmnns" should read --windings--;
In Column 10, line 5 (Claim 19, line 2) both occurrences of the word "MOSFETs" should read --MOSFETS--.

Signed and Sealed this

Twenty-sixth Day of August, 2008

JON W. DUDAS
*Director of the United States Patent and Trademark Office*